J. T. FORD.
CAR DOOR ROLLER.
APPLICATION FILED FEB. 8, 1915.
1,163,396.
Patented Dec. 7, 1915.
2 SHEETS—SHEET 1.
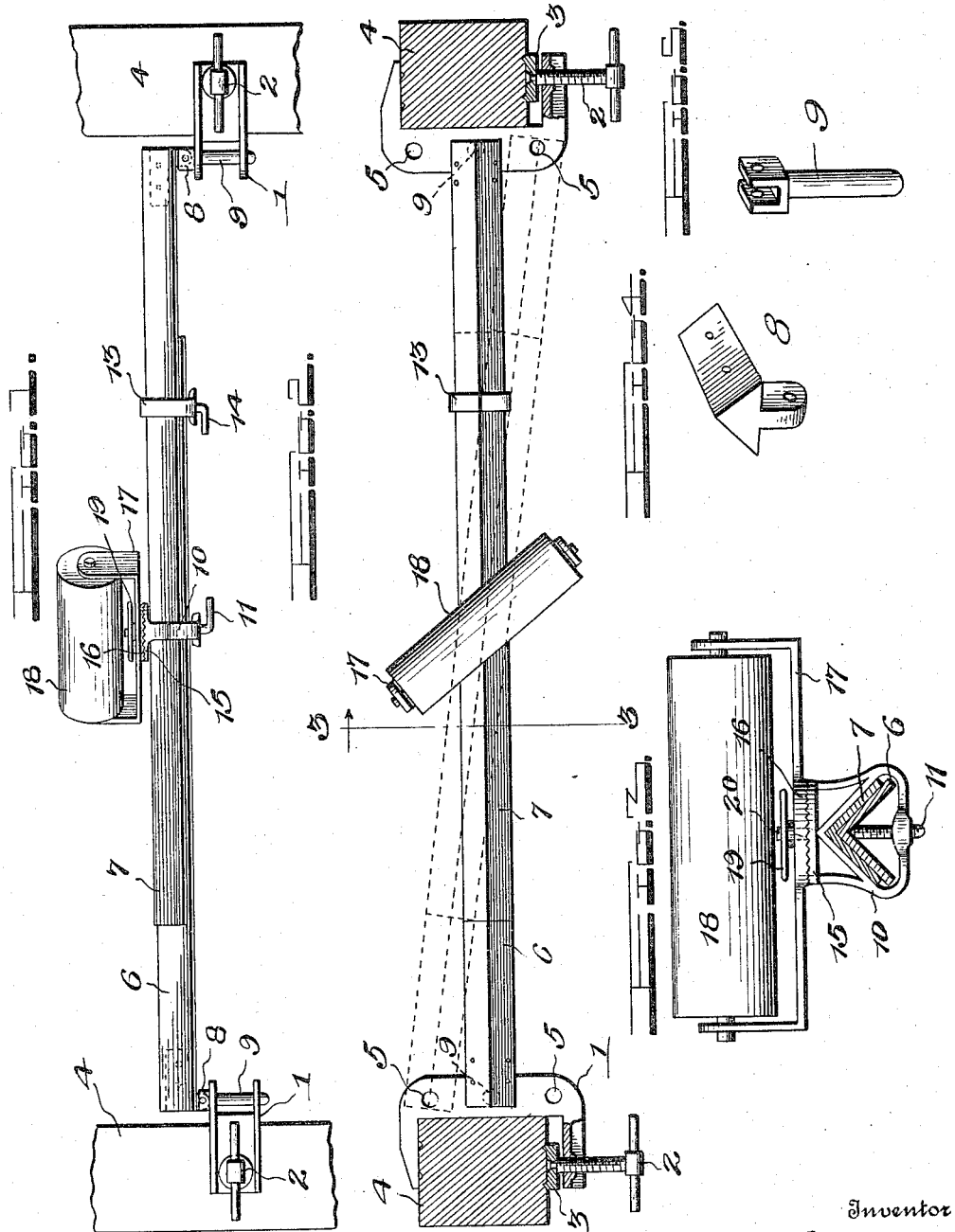
Inventor
James T. Ford,
Witnesses
By H. B. Willson & Co.
Attorneys

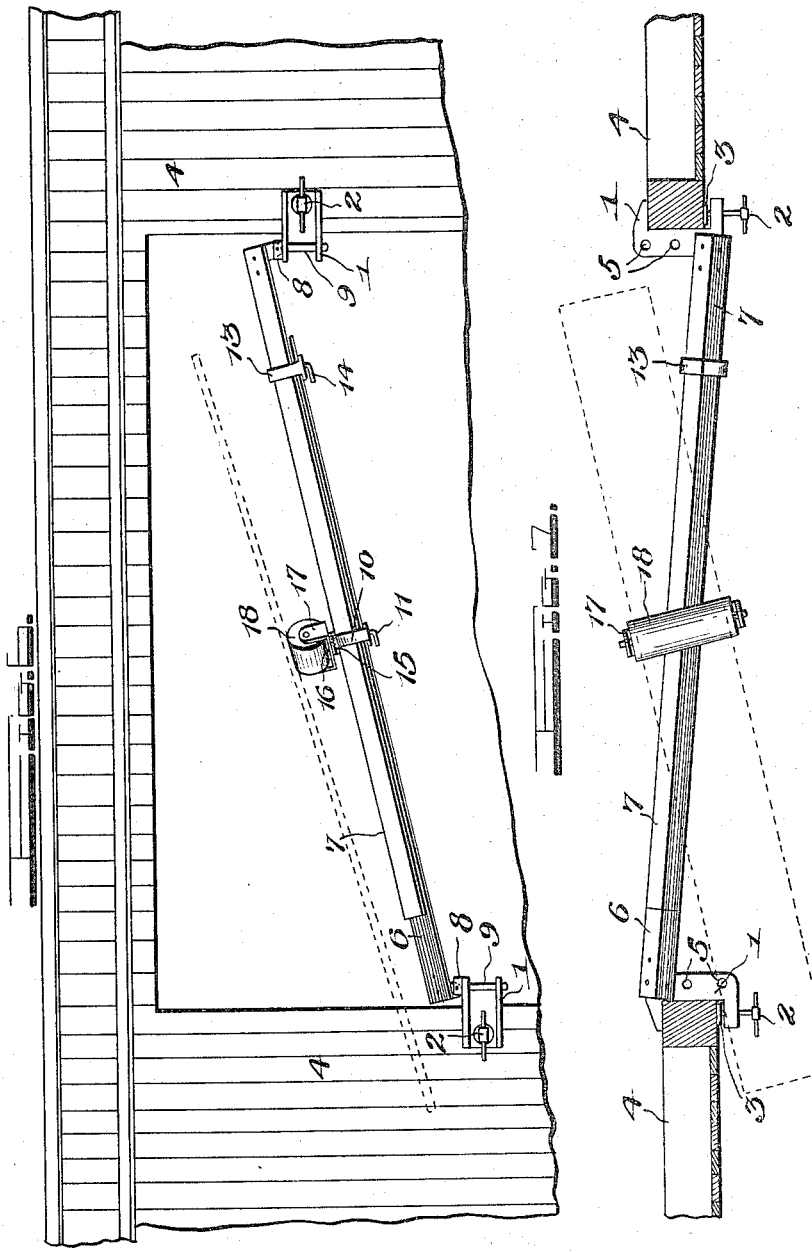

UNITED STATES PATENT OFFICE.

JAMES THOMAS FORD, OF VERDI, NEVADA.

CAR-DOOR ROLLER.

1,163,396. Specification of Letters Patent. Patented Dec. 7, 1915.

Application filed February 8, 1915. Serial No. 6,943.

*To all whom it may concern:*

Be it known that I, JAMES T. FORD, a citizen of the United States, residing at Verdi, in the county of Washoe and State of Nevada, have invented certain new and useful Improvements in Car-Door Rollers; and I do declare the following to be a full, clear, and exact description of the invention, such as will enable others skilled in the art to which it appertains to make and use the same.

It is the object of this invention to provide an improved lumber loading or unloading mechanism such as is employed in doorways of freight cars.

More particularly, the invention relates to an improved means for adjusting and attaching the device to different sized door frames and for adjusting the supporting roller so that the lumber may be withdrawn or loaded onto the freight car from any desired or convenient angle.

A further object of the invention relates to improved means for laterally adjusting the supporting arms between the door frame whereby the same may be held in any desired angle, with one end supported adjacent the front of the frame and the other adjacent the rear, to minimize the danger of lumber dropping upon the arms and damaging them during the loading or unloading operation.

Another object of the invention relates to improved means for holding the supporting arms in an oblique or inclined position across the car door frame to make the upper inner ends of the car easily accessible for loading or unloading when the car is loaded to within a few feet of its capacity.

With the above and other objects in view, the invention consists of certain novel features of construction, combination and arrangement of parts as will be more fully described and claimed.

In the accompanying drawings: Figure 1 is a side elevation of the device attached to a car door frame; Fig. 2 is a section of the car door frame showing the device attached thereto in top plan view; Fig. 3 is a detail vertical section on the line 3—3; Fig. 4 is a detail perspective of one of the castings that are secured in the ends of the V-shaped sections held longitudinally between the door frame; Fig. 5 is a detail perspective view of one of the pins pivoted from the casting; Fig. 6 is a side elevation of the device attached to a car door frame positioned to load or unload the car when the same is nearly full; and Fig. 7 is a section of the car door showing the device attached thereto in top plan view in the position above described.

Referring more particularly to the drawings, the device is illustrated as comprising a support consisting of two channel iron sections 6 and 7 having angularly disposed wings, so that when the sections are properly assembled, the section 7 is disposed above the section 6 and adapted to slide thereon. In connecting the sections 6 and 7, two saddle clamps 10 and 13 are slidably disposed upon the section 7 and embrace this section, and threaded through the bases of these clamps and bearing at their upper ends against the under side of the section 6 at the apex thereof, are securing screws indicated by the numerals 11 and 14 which have latteral handles to be grasped for the purpose of rotating them.

Disposed within the concavities of the supporting sections at their outer ends and secured in place in said concavities, are castings each with a depending apertured lug indicated by the numeral 8. Pivotally swinging from said depending lugs are vertically disposed pins 8 for the purpose hereinafter to be described.

Slidably disposed on the frame 4 of the car door are U-shaped clamps 1 which are held to the frame by securing screws 2, with biting plates 3 on their inner ends, mounted through one of the arms of the U-shaped clamps to engage the clamp 4 to hold the said clamps at any desired vertical adjusted position on the same. The upper and lower edges of the clamps 1 are outwardly flanged or lipped and the flanged or lipped portions adjacent the inner wall of the frame 4 have a plurality of openings 5 in alinement with each other for the reception of the pins 8 held on the ends of the supporting sections 6 and 7.

Upon the upper end of the saddle clamp 10 is a circular table 15 with a central vertical upwardly extending bolt 20. The upper surface of the table has radially projecting teeth adapted to engage corresponding teeth on the lower surface of an integral table 16 at the bottom of a roller supporting bracket 17, above the same. The table 16 has a central aperture through which the bolt 20 threaded near its top projects. The plates are held together by means of a lever nut 19, threaded upon the upper end of said bolt 20. Journaled in the bracket 17 is a lumber supporting roller 18.

In the use of the device, the roller 18 can be adjusted to any desired position or angle by means of the bolt 20, plates 15 and 16 and lever nut 19, thus facilitating the loading or unloading of lumber. It will be further understood that the sections 6 and 7, sliding one upon the other, held together by the saddle clamps 10 and 13 and secured firmly by the screws 11 and 14, allow for a sliding adjustment. The alining holes in the flanges of the clamps 1, permit lateral adjustment of the sections between the said clamps, by any shifting of the pins 9 at each end of the sections in the holes 5 whereby the said sections may be moved inwardly and outwardly in the car door frame, or one end moved in and the other out, as shown in Fig. 7 of the drawings. By placing the sections in the position shown in the figure above mentioned, the possibility of lumber dropping upon the sections and injuring them when it comes off the roller, is greatly lessened and the said sections will be held in an angle from the roller 18, and practically clear from under the same, thereby allowing a large area in which the lumber may be dropped without any danger of striking and injuring the roller supporting sections. Furthermore, by pivoting the pins 9 on the outer ends of the adjustable sliding sections 6 and 7 and having the clamps 1 vertically adjustable on the car door frame, the said sections are adapted to be held in an obliquely inclined position across the car door frame, for instance as shown in Fig. 6 of the drawings. This position is especially useful when the car is loaded up to within a few feet of the top when it is difficult to reach the remaining space. The sections can be placed in the position substantially as seen by Fig. 6 and the lumber pushed over the roller 18 up into the car at the upper end of the section, to fill the remaining space at that end of the car. By reversing the sections and repeating the operation, the other end of the car may be easily reached and filled.

By using the various adjustments used in this device as hereinbefore described, it is obvious that a car may be expeditiously loaded or unloaded at a great saving of time and minimum expenditure of labor.

I claim:—

1. In a device of the class described, a bar for disposition in a car door frame, a roller carried by said bar, socket members secured on the car door frame, and depending extensions on the ends of said bar coacting with the socket members to laterally adjust the bar in the car door frame.

2. In a device of the class described, a bar for disposition in a car door frame, a roller carried by said bar, clamps on the car door frame, flanges on said clamps having spaced apertures, and pins carried by the ends of said bar to engage said apertures to laterally adjust the bar in the car door frame.

3. In a device of the class described, a bar for disposition in a car door frame, a roller carried by said bar, castings secured within the outer ends of said bar, pins depending from said castings, horizontally disposed U-shaped clamps adapted to be secured to the car door frame, and said U-shaped clamps having apertured upper and lower flanges to receive the pins depending from the castings to support the bar between said clamps and to provide a lateral adjustment for the same in the car door frame.

4. In a device of the class described, a longitudinally adjustable bar for disposition in a car door frame, a roller carried by said bar, vertically adjustable supporting members on the car door frame, and depending longitudinal swinging extensions on the ends of said bar connected with the supporting members to obliquely adjust the bar in the car door frame.

5. In a device of the class described, a longitudinally adjustable bar for disposition in a car door frame, a roller carried by said bar, vertically adjustable independent clamps adapted to be secured on the car door frame, apertured flanges on said clamps, and pins pivoted to the ends of said bar adapted to engage said apertures to obliquely position the bar in the car door frame.

6. In a device of the class described, a longitudinally adjustable bar for disposition in the car door frame, a roller carried by said bar, depending pins pivotally connected with the ends of said bar, horizontally disposed vertically adjustable U-shaped clamps adapted to be secured to the car door frame, and said clamps being apertured to receive the pivot pins on the ends of the bar to support said bar when obliquely adjusted in the car door frame.

7. In a device of the class described, a longitudinally adjustable bar for disposition in a car door frame, a lumber sliding roller carried on said bar, castings secured in the outer end of said bar, apertured lugs depending from said castings, pins with bifurcated apertured upper ends pivotally connected with said lugs, independent U-shaped supporting clamps adapted to be vertically adjustable in the car door frame, and said U-shaped clamps having projecting upper and lower flanges on their inner faces with a plurality of alined apertures therethrough to receive the pivot pins on the ends of the bar substantially as described.

In testimony whereof I have hereunto set my hand in presence of two subscribing witnesses.

JAMES THOMAS FORD.

Witnesses:
ALEX WIDLUND,
J. O. JENSEN.

Copies of this patent may be obtained for five cents each, by addressing the "Commissioner of Patents, Washington, D. C."